(12) United States Patent
Tenmyo

(10) Patent No.: US 7,506,988 B2
(45) Date of Patent: Mar. 24, 2009

(54) ILLUMINATION APPARATUS AND IMAGE-TAKING APPARATUS

(75) Inventor: Yoshiharu Tenmyo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 11/338,073

(22) Filed: Jan. 24, 2006

(65) Prior Publication Data
US 2006/0171165 A1 Aug. 3, 2006

(30) Foreign Application Priority Data
Feb. 3, 2005 (JP) ............... 2005-027171

(51) Int. Cl.
*F21V 33/00* (2006.01)
(52) U.S. Cl. ............... 362/16; 362/3; 362/326; 362/340
(58) Field of Classification Search ............... None
See application file for complete search history.

(56) References Cited

U.S. PATENT DOCUMENTS

| | | | | |
|---|---|---|---|---|
| 6,011,929 A | * | 1/2000 | Fuke et al. ................ | 396/175 |
| 6,097,549 A | * | 8/2000 | Jenkins et al. ............ | 359/726 |
| 7,159,996 B2 | * | 1/2007 | Huang et al. .............. | 362/225 |
| 2004/0135912 A1 | * | 7/2004 | Hofflinger et al. ......... | 348/308 |
| 2004/0159850 A1 | * | 8/2004 | Takenaka .................. | 257/98 |

FOREIGN PATENT DOCUMENTS

JP        2003-222941        8/2003

* cited by examiner

*Primary Examiner*—Laura Tso
(74) *Attorney, Agent, or Firm*—Cowan, Liebowitz & Latman, P.C.

(57) ABSTRACT

An illumination apparatus is disclosed in which its efficiency as an optical system can be improved by effectively utilizing the luminous flux that was not used in conventional illumination apparatuses, and the positional relationship between a light source and an optical member can be set with accuracy. The illumination apparatus comprises a light source, and an optical member having a refractive surface on a side closer to an irradiation range than the light source. The optical member includes a holding portion which holds the light source.

3 Claims, 10 Drawing Sheets

ILLUMINATION APPARATUS AND IMAGE-TAKING APPARATUS

FIELD OF THE INVENTION

The present invention relates to illumination apparatuses suitable for flash units used in image-taking, especially illumination apparatuses whose characteristic of distribution of light from a light source is controlled by an optical member having a light condensing action.

BACKGROUND OF THE INVENTION

This kind of illumination apparatus has a structure in which a holding member made of a material having elasticity and heat resistance, such as a white or ivory yellow silicone rubber, holds glass tube portions near the terminals of a flash discharge tube that is a light source. This is for preventing a breakage of the flash discharge tube caused by the direct transmission of external force (impact strength) acting on the illumination apparatus to the flash discharge tube when the holding member is not an elastic member but a rigid member. This is also for avoiding troubles caused by deformation or alteration of the holding member made of a material with a low heat resistance when the portions near the terminals of the flash discharge tube have high temperatures due to continuous emission of light.

On the other hand, an illumination optical system requires maintenance of optical characteristics even if its orientation is changed and external impact strength acts on it. For this, it is necessary to keep the positional relationship between the light source and the optical member with accuracy, and the elasticity of the holding member plays an important role in keeping this positional relationship. In other words, keeping the positional relationship is generally performed by bringing the flash discharge tube in contact with positioning dowels formed on a reflector and using pressing force or repulsive force generated by the silicone rubber. This intends to properly keep the positional relationship between the light source and optical member to maintain the optical characteristics by utilizing the elastic force generated in the silicone rubber (see Japanese Patent Laid-Open application No. 2003-222941).

The method for holding the light source in the conventional illumination apparatuses is thus devised to satisfy mechanical requirements such as holding structures preventing breakages of the light source, measures against heat generating from the light source, and accurate positioning between the light source and the optical member.

However, in the conventional illumination apparatuses, though light rays from the light source directly impinge on the holding member, these light rays are not used positively as illumination light. In other words, since the luminous flux from the light source includes many unused components, the conventional illumination apparatuses are not necessarily efficient.

Furthermore, since the positional relationship between the light source and the optical member is kept not by the direct contact thereof with each other, but by the intervention of the holding member having a manufacturing tolerance, the setting of the positional relationship is not necessarily accurate.

Moreover, using the holding member that is a member separate from the optical member increases the number of constituent members of the illumination apparatus.

BRIEF SUMMARY OF THE INVENTION

An object of the present invention is to provide an illumination apparatus in which its efficiency as an optical system can be improved by effectively utilizing the luminous flux that was not used in the conventional illumination apparatuses, the positional relationship between a light source and an optical member can be set with accuracy, and the number of the constituent members and the number of assembling processes can be decreased.

An illumination apparatus that is one aspect of the present invention comprises a light source, and an optical member having a refractive surface on a side closer to an irradiation range than the light source. The optical member includes a holding portion which holds the light source.

Other objects and further features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

FIGS. 1 to 4 show an illumination apparatus that is Embodiment 1 of the present invention. The illumination apparatuses of this embodiment and the later-described embodiments are used as flash units built into image-taking apparatuses such as a digital still camera, video camera, single-reflex camera, and film camera. The present invention can be also applied to an external illumination apparatus attached to the image-taking apparatuses.

Figure 1:
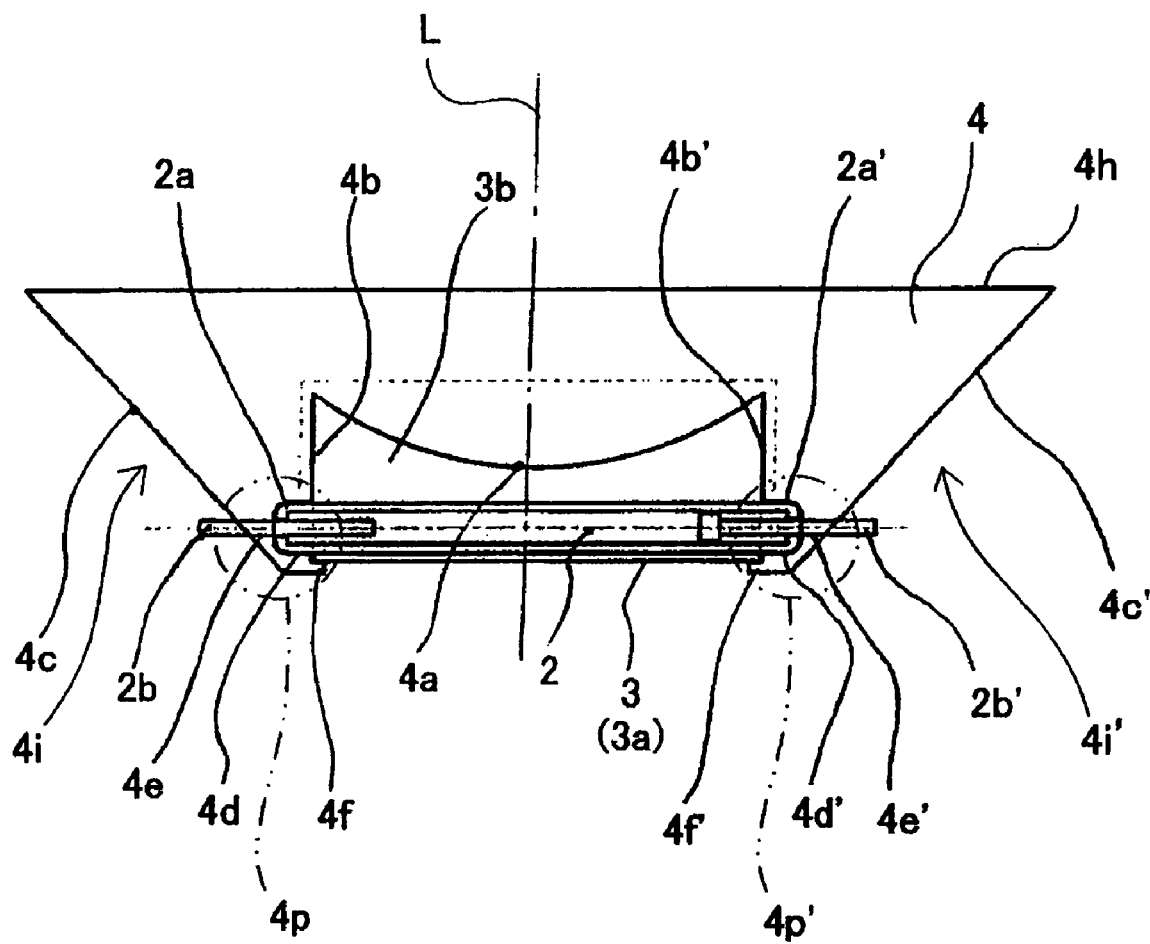
FIG. 1 is a horizontally sectional view showing the structure of the illumination apparatus that is Embodiment 1 of the present invention.
Figure 2:
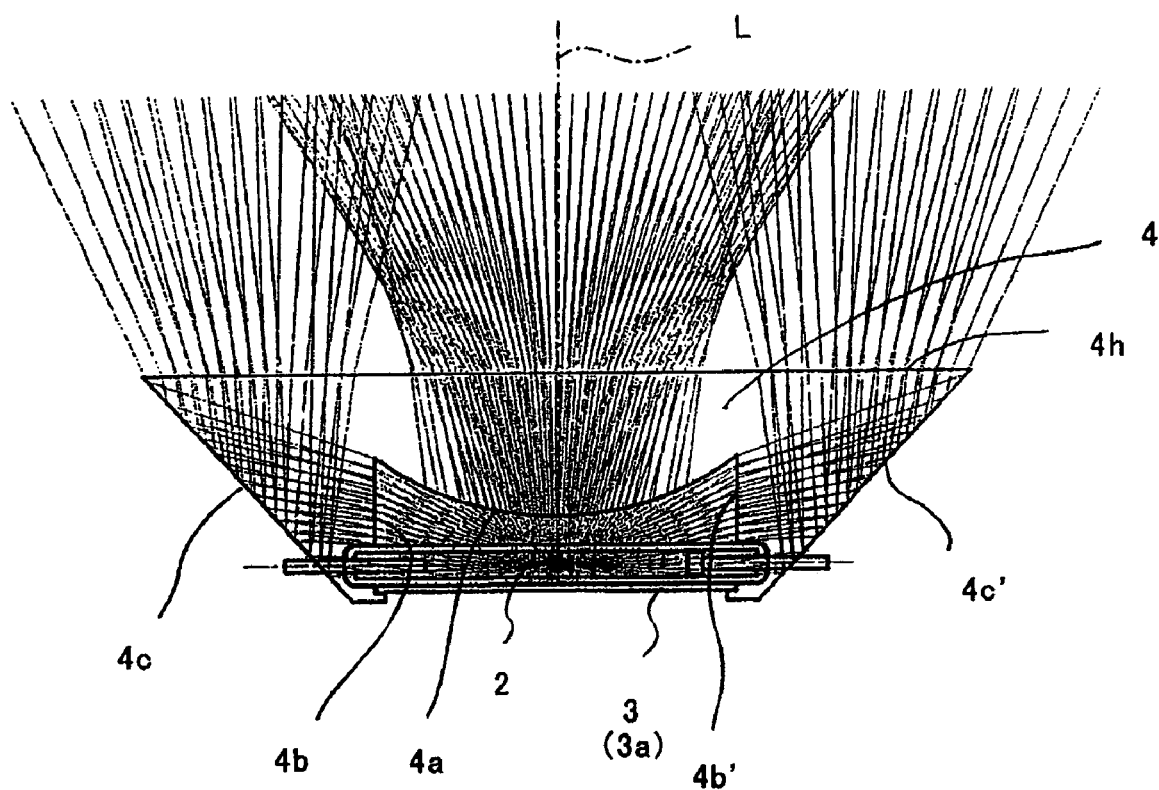
FIG. 2 is a light ray tracing diagram of the illumination apparatus of Embodiment 1.
Figure 3:
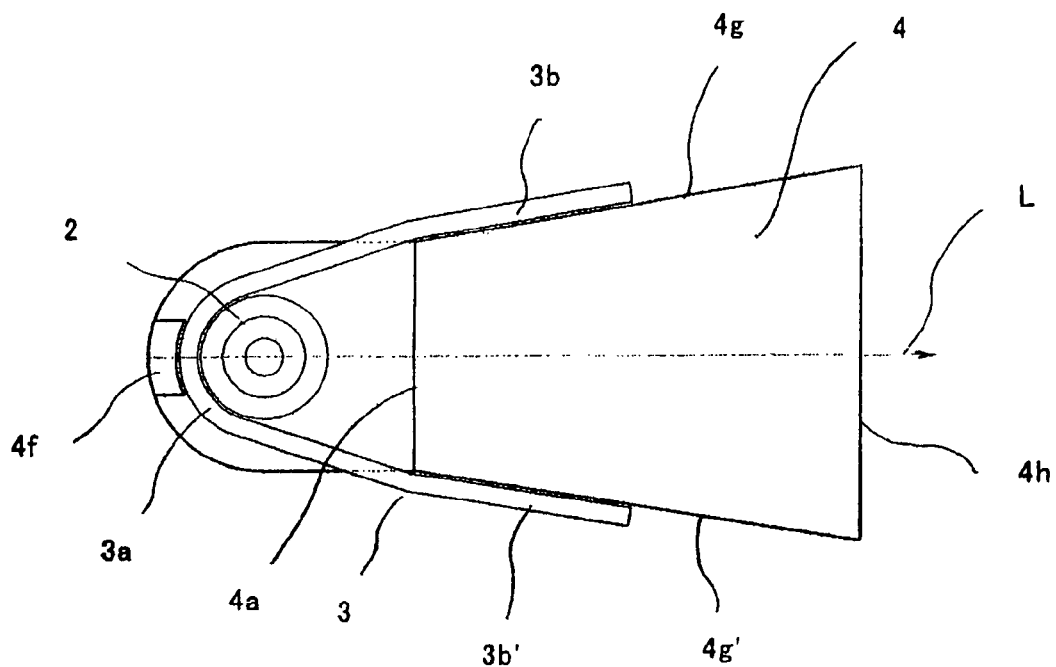
FIG. 3 is a vertically sectional view showing the structure of the illumination apparatus of Embodiment 1.
Figure 4:
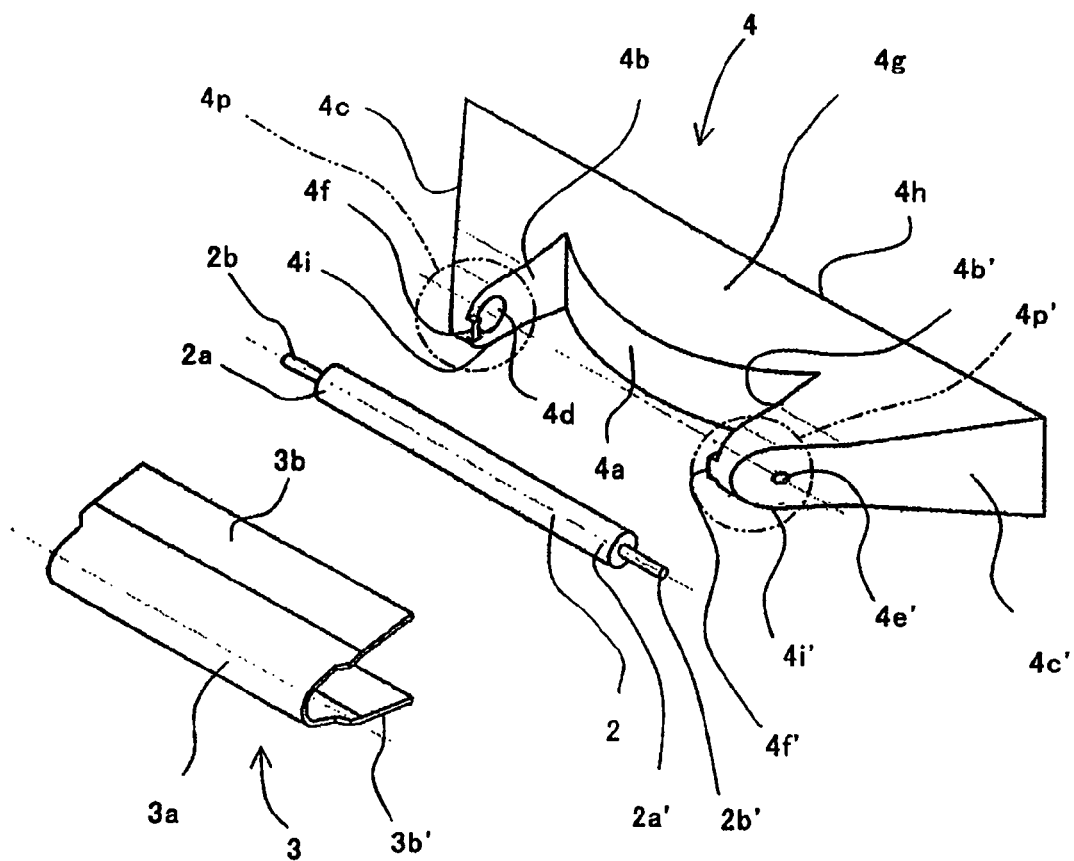
FIG. 4 is an exploded perspective view showing the illumination apparatus of Embodiment 1.
Figure 5:
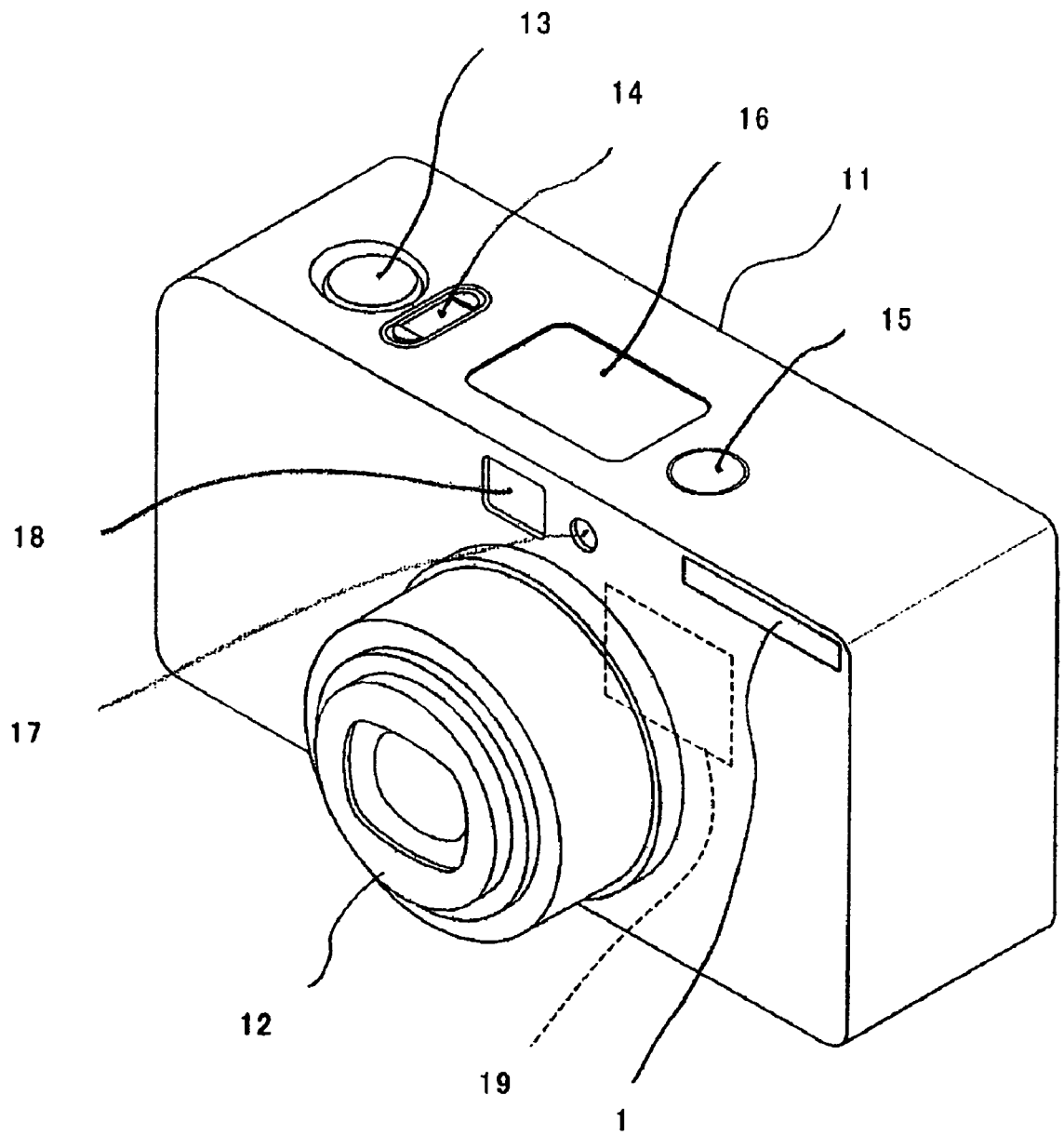
FIG. 5 is a perspective view showing a camera equipped with the illumination apparatus of Embodiment 1.

FIG. 1 is a horizontally sectional view showing the illumination apparatus when cut at a plane including the center axis of a discharge tube. FIG. 2 is a light ray tracing diagram in which the representative light rays emitted from the center of the discharge tube are added in the horizontally sectional view of the illumination apparatus. FIG. 3 is a vertically sectional view showing the illumination apparatus when cut at a plane orthogonal to the center axis of the discharge tube. FIG. 4 is an exploded perspective view showing the substantial members of the optical system of the illumination apparatus. FIG. 5 shows a so-called digital still camera equipped with the illumination apparatus.

First, the description will be made of the digital still camera incorporating the illumination apparatus of this embodiment. The cameras incorporating the illumination apparatuses of other embodiments are the same as the camera shown in FIG. 5.

In FIG. 5, 11 denotes a camera body. 12 denotes a taking lens barrel which is provided at the substantial center of the front surface of the camera body 11. 1 denotes the illumination apparatus of this and other embodiments, which is provided in the upper right area of the camera body 11 when viewed from the front.

13 denotes a release button causing the camera to execute an image-taking operation. 14 denotes a zoom switch that is an operation member causing the taking lens to execute zooming. Operating the zoom switch forward causes the taking lens to execute zooming in the telephoto direction, and operating the zoom switch rearward causes the taking lens to execute zooming in the wide direction.

15 denotes an operation button for setting various operation modes of the camera. 16 denotes a liquid crystal displaying panel showing the operational state of the camera to a user. 17 denotes a light-entering window of a photometry unit measuring brightness of the object. 18 denotes an observation window of an optical finder.

19 denotes an image-pickup element such as a CCD sensor and a CMOS sensor, photoelectricallyz converting an object image formed by the taking lens.

Next, the description will be made of the illumination apparatus of this embodiment with reference to FIGS. 1 to 4.

In these figures, 2 denotes a cylindrical light-emitting discharge tube (for example, xenon tube). Hereinafter, the cylindrical light-emitting discharge tube 2 is referred to as a discharge tube. 3 denotes a reflector (or reflective member) which reflects forward in the irradiation optical axis L (or right direction in FIG. 3) the light components emitted from the discharge tube 2, the light components proceeding rearward in the direction of the irradiation optical axis L (or left direction in FIG. 3), upward, and downward from the discharge tube 2. The reflector 3 is formed by a member whose light-source side surface is made of a high-reflectance aluminum, or a resin member on which a high-reflectance metal is evaporated, etc.

4 denotes an optical member disposed forward of the discharge tube (or on a light irradiation side), in other words, on the side closer to an irradiation range than the discharge tube 2. The optical member 4 is formed integrally as a transparent member.

As shown in FIG. 1, in the central portion near the irradiation optical axis L of the entrance surface of the optical member 4, a cylindrical lens surface (or positive refractive portion) 4a having positive refractive power in the longitudinal direction of the discharge tube 2 is formed. In the left and right peripheral portions of the optical member 4, prism portions 4i and 4i' having refractive surfaces (or entrance surfaces) 4b and 4b' and reflective surfaces 4c and 4c', respectively, are formed.

In the rear parts of the prism portions 4i and 4i', concave portions 4d and 4d' for holding the ends of the glass tube portion of the discharge tube 2 are formed. The rear parts of the prism portions 4i and 4i', or the concave portions 4d and 4d' and peripheral portions thereof, function as holding portions 4p and 4p' that directly hold the discharge tube 2, and also function so as to reflect the luminous fluxes, which emitted from the discharge tube 2 and entered the prism portions 4i and 4i', at the reflective surfaces 4c and 4c' to lead them forward. The front surface of the optical member 4 is the exit surface 4h.

The conventional illumination apparatuses use, as the material of this kind of optical member, optical high-polymer materials with a high transmittance such as polymethylmethacrylate (PMMA). This is because these materials are lower in cost, lighter in weight, and easier to shape than glass and ceramic.

However, in this embodiment, the optical member is made of a resin material such as a transparent silicone rubber and a transparent silicone resin in order to improve the light-source holding structure. Especially, silicone resins are best as the material of a member used for holding the light source having high temperatures in this embodiment because they generally have heat resistance, weather resistance, electrical insulation property, water repellency, an appropriate elasticity, and an appropriate hardness (or mechanical strength).

Further, in this embodiment, giving transparency to the silicone resin in addition to these basic mechanical characteristics achieves a material that can also function as an optical material with a high transmittance.

In the above-described camera equipped with the illumination apparatus constituted as above, a CPU (not shown) determines whether the illumination apparatus is to emit light or not, based on the object brightness measured by the photometry unit (not shown) and the sensitivity of the image-pickup element 19, in response to the first stroke operation (or half-press operation) of the release button 13, for example, when the camera is set to a "flash automatic mode".

When determining that the "illumination unit is to emit light" under the current image-taking condition, the CPU outputs an emission signal to an emission controller (not shown) in response to the second stroke operation (or full-press operation) of the release button 13. The emission controller outputs a trigger signal to the discharge tube 2 via a trigger lead wire (not shown) to cause the discharge tube 2 to emit light.

Of the luminous fluxes emitted from the discharge tube 2, the luminous flux emitted rearward, upward, and downward in FIG. 3 is reflected by the reflector 3, and then enters the optical member 4. The luminous flux emitted forward directly enters the optical member 4. These luminous fluxes are converted into a luminous flux with a predetermined light distribution characteristic by the optical member 4, and then emerged on an object side.

Next, the detailed description will be made of the structure of the illumination apparatus of this embodiment with reference to FIGS. 1 to 3. FIGS. 1 and 2 show a basic concept for irradiating a component of the luminous flux emitted from the discharge tube 2 effectively within a predetermined irradiation angle range, the light component proceeding in the horizontal direction (or right and left directions) that is the longitudinal direction of the discharge tube 2. FIGS. 1 and 2 show the shape of the illumination apparatus in the same section.

First, the description will be made of the method for holding the discharge tube 2 and the reflector 3 by the optical member 4 with reference to FIG. 1.

As described above, in the rear parts of the prism portions 4i and 4i', the concave portions 4d and 4d' encompassing (or surrounding the circumference of) the glass tube ends 2a and 2a' of the discharge tube 2 and through-holes 4e and 4e' through which terminals 2b and 2b' extending from the glass tube ends 2a and 2a' are put are formed. Lead wires extending from the electrodes of a main condenser, not shown, are connected to the tips of the terminals 2b and 2b' that are put through the through-holes 4e and 4e'.

The optical member 4 is elastically deformable according to its material characteristics and its shape described above. Therefore, pressing or tightly inserting the glass tube ends 2a and 2a' into the concave portions 4d and 4d' of the prism portions 4i and 4i' with elastic deformation of the optical member 4 makes it possible for the optical member 4 to hold the discharge tube 2 integrally so that they may satisfy a predetermined positional relationship.

The reflective surfaces 4c and 4c' constituting the prism portions 4i and 4i' are formed so as to extend outward beyond the glass tube ends 2a and 2a' in the horizontal direction, in other words, so as to cover the end faces of the glass tube ends 2a and 2a'. This is for improving the irradiation efficiency by utilizing also a luminous flux component emitting horizontally from the glass tube ends 2a and 2a'.

In addition, the optical member 4 holds the reflector 3. As shown in FIG. 3, the reflector 3 has a half cylindrical surface 3a that substantially contacts the rear outer surface of the discharge tube 2 and is substantially concentric with the discharge tube 2, and upper and lower surfaces 3b and 3b' that extend from the half cylindrical surface 3a to the middle portion of upper and lower surfaces 4g and 4g' of the optical member 4.

The upper and lower surfaces 4g and 4g' of the optical member 4 are set so that almost all luminous fluxes from the discharge tube 2 may satisfy the total reflection condition as described later. However, the upper and lower surfaces 3b and 3b' of the reflector 3 have an optical function for returning the luminous flux that emerged from the upper and lower surfaces 4g and 4g' of the optical member 4 (that is, the luminous flux not satisfying the total reflection condition with respect to the upper and lower surfaces 4g and 4g') into the optical member 4, and a mechanical function for stopping the rotation of the reflector 3 around the discharge tube 2.

The reflector 3 engages with retaining portions 4f and 4f' formed at the rear ends of the prism portions 4i and 4i'. Thereby, the optical member 4 integrally holds the reflector 3.

The upper and lower surfaces 3b and 3b' of the reflector 3 extend so as to substantially cover the space facing the discharge tube 2 and the entrance surfaces 4a, 4b, and 4b' of the optical member 4. Therefore, almost all luminous fluxes emitted from the discharge tube 2 (including the luminous flux reflected by the reflector 3) enter the optical member 4 from the entrance surfaces 4a, 4b, and 4b'.

As described above, the optical member 4 in this embodiment is not only made of a transparent material so as to have effective optical characteristics, but also has characteristics suitable for holding the discharge tube 2 and reflector 3. Concretely, the prism portions 4i and 4i' of the optical member 4 have an appropriate elasticity so as not to directly transmit external force acting on the optical member 4 to the discharge tube 2, and a good heat resistance.

Moreover, the optical member 4 in this embodiment is effective not only for holding the discharge tube 2 and reflector 3 and improving the optical characteristics, but also for facilitating the assembly of the illumination apparatus 1. In other words, an assembler elastically deforms the optical member 4 to make it hold the discharge tube 2 first, and then builds the reflector 3 onto the optical member 4. Thus, the assembly of the illumination apparatus 1 can make best use of the characteristics of the material of the optical member 4.

As described above, the optical member 4 in this embodiment can increase the utilization efficiency of the luminous flux emitted from the discharge tube 2 by its optical action, and hold the discharge tube 2 and reflector 3 at their accurate positions.

Next, the description will be made of characteristic optical actions of the illumination apparatus 1 with reference to the light ray tracing diagram in FIG. 2.

In the section shown in FIG. 2, the luminous flux emitted from the center of the discharge tube 2 is divided roughly into a first luminous flux component proceeding toward the cylindrical lens surface 4a formed at the vicinity of the irradiation optical axis L (or central portion) of the optical member 4, and a second luminous flux component emitting at an angle larger than that of the first luminous flux component with respect to the irradiation optical axis L and then proceeding toward the entrance surfaces 4b and 4b' formed in the periphery thereof. Since a third luminous flux component proceeding toward the reflector 3 is returned into the optical member 4 by reflection of the reflector 3, it can be treated the same as one of the above-described first and second luminous flux components.

In this kind of conventional illumination apparatus, since the luminous flux component proceeding toward the periphery was not sufficiently considered, much of the luminous flux component was not emerged from the illumination apparatus or became light outside a predetermined irradiation range though it was emerged from an exit surface. In contrast, this embodiment is characterized in that the optical member 4 effectively utilizes the luminous flux component proceeding toward the periphery.

As shown in FIG. 2, the luminous flux component emitted from the center of the discharge tube 2 and proceeding toward the periphery enters the prism portions 4i and 4i', and proceeds through the inside of the prism portions 4i and 4i' along the glass tube ends 2a and 2a' and the terminals 2b and 2b' of the discharge tube 2. This luminous flux component includes a luminous flux emitted from the glass tube ends 2a and 2a' and then entering the prism portions 4i and 4i' from the inner surfaces of the concave portions 4d and 4d'.

In the conventional illumination apparatus, since a holding member for holding the discharge tube was provided, which was a member separate from the optical member and not given any optical consideration, the luminous flux component reaching the holding member was absorbed in the illumination apparatus without emerging from the exit surface.

In contrast, in this embodiment, the optical member 4 itself has the holding portions 4p and 4p' (or rear parts of the prism portions 4i and 4i') for holding the discharge tube 2, and leads the luminous flux entering here in the direction toward the exit surface 4h, that is, forward by the total reflection action of the reflective surfaces 4c and 4c' as light leading areas. Therefore, optimizing the shape of the reflective surfaces 4c and 4c' makes it possible to condense the luminous flux including a component that was not utilized in the conventional illumination apparatuses in the predetermined irradiation range, thereby increasing the utilization efficiency of light.

Although the reflective surfaces 4c and 4c' are formed as a plane forming an angle of about 45 degrees to the irradiation optical axis L in this embodiment, the reflective surface in the present invention is not limited thereto. Other surfaces such as a curved surface and a toric surface may be used as the reflective surface. Such a curved surface is preferable for achieving a more efficient illumination apparatus.

Moreover, in this embodiment, the optical member 4 is constituted so as to divide the luminous flux emitted from the center of the light source into a luminous flux component entering from the central portion of the optical member 4 and a luminous flux entering from the left and right peripheral portions of the optical member 4, and so as to give the same irradiation angle distribution to these luminous flux components. Thereby, it is possible to efficiently utilize the luminous flux emitted from the light source, and obtain a substantially even light distribution characteristic as a whole.

Thus, in this embodiment, the optical member 4 itself directly holds the discharge tube 2 (and the reflector 3) by taking advantage of the material characteristics thereof, thereby eliminating the holding member used in the conventional illumination apparatuses. Therefore, the number of the constituent members of the illumination apparatus can be minimized, and the positional relationship between the discharge tube 2, reflector 3, and optical member 4 can be set accurately, thereby assuring and maintaining good optical characteristics.

The minimum requirements for this embodiment's illumination apparatus are that the optical member 4 has a function for holding the discharge tube 2, that the luminous flux proceeding to the vicinity of the terminals 2b and 2b' of the discharge tube 2 is utilized, and that the optical characteristics for the luminous flux are improved. To meet these requirements, it is necessary that, at least, the optical member 4 be made of a transparent member having elasticity in the portions holding the discharge tube 2 (that is, prism portions 4i and 4i').

On the other hand, this embodiment adopts the structure in which the nonconductive optical member 4 covers the terminals 2b and 2b' of the discharge tube 2. This is for assuring electrical insulation property so that a trigger signal with a high voltage may not be directly applied to the terminals 2b and 2b', though the trigger signal for causing the discharge tube to emit light is normally applied to transparent electrode coating films formed on the glass tube portion. In other words, the trigger lead wires are connected to the transparent electrode coating films formed at the central portion of the discharge tube 2 via the reflector 3. And, the optical member 4 insulates between the terminals 2b and 2b' and the transparent electrode coating films so that direct discharge between them may be hard to occur. Both the silicone resin and silicone rubber used in this embodiment are effective optical materials because of their electrical insulation properties.

Although the exit surface 4h of the optical member 4 is formed as a plane in this embodiment, a surface having optical power or diffusing action such as a curved surface and a Fresnel lens may be used. Moreover, although the central surface of the entrance portion of the optical member 4 is formed as a cylindrical lens surface in this embodiment, a Fresnel lens may be used.

Further, although the optical member 4 holds the glass tube ends 2a and 2a' of the discharge tube 2 in this embodiment, the portion held by the optical member 4 is not limited thereto, the central portion of the discharge tube 2 may be held, for example.

Furthermore, although the glass tube ends 2a and 2a' of the discharge tube 2 are held by pressing them into the optical member 4 in this embodiment, an insertion method such as the press fit method is not necessarily required for holding the discharge tube 2. Other holding methods, for example, a pressurized contact method can be used.

Furthermore, although the reflective surfaces 4c and 4c' formed on the sides of the optical member 4 lead the luminous flux proceeding toward the peripheral portions of the optical member 4 from the light source forward by their total reflection actions in this embodiment, the structure of the optical member is not limited thereto. For example, the shape of the entrance surfaces may be designed so as to lead the luminous flux forward only by their refraction actions.

Moreover, although silicone resin materials such as a silicone resin and a silicone rubber are used as the material of the optical member 4 in this embodiment, materials other than the silicone resin materials may be used. For example, an optical material satisfying both the optical characteristics and the function for holding the discharge tube may be used, and a composite material that is made by combining multiple optical materials and has the same characteristics and functions may be used.

Furthermore, although each of the entrance and exit surfaces of the optical member 4 has a symmetric shape with respect to the irradiation optical axis L in this embodiment, the shape is not limited thereto. For example, although the prism portions 4i and 4i' are symmetric with respect to the irradiation optical axis L in this embodiment, they may be asymmetric. This is not only for the prism portions, but also for the central cylindrical lens surface 4a.

Embodiment 2

Figure 6:
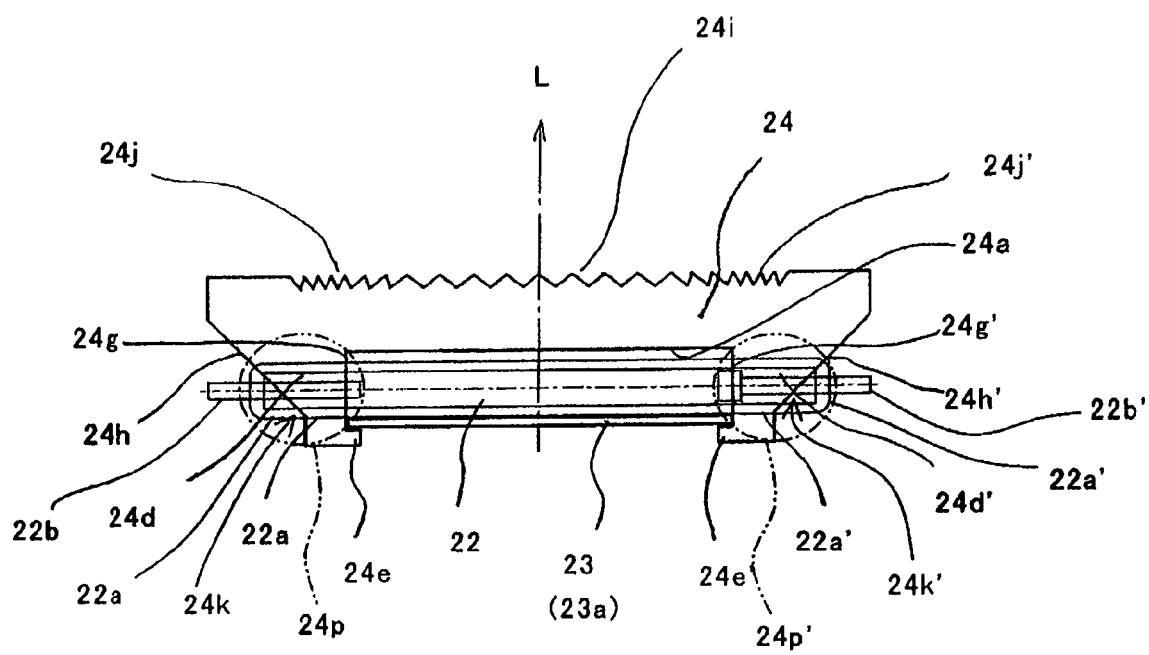
FIG. 6 is a horizontally sectional view showing the structure of the illumination apparatus that is Embodiment 2 of the present invention.
Figure 7:
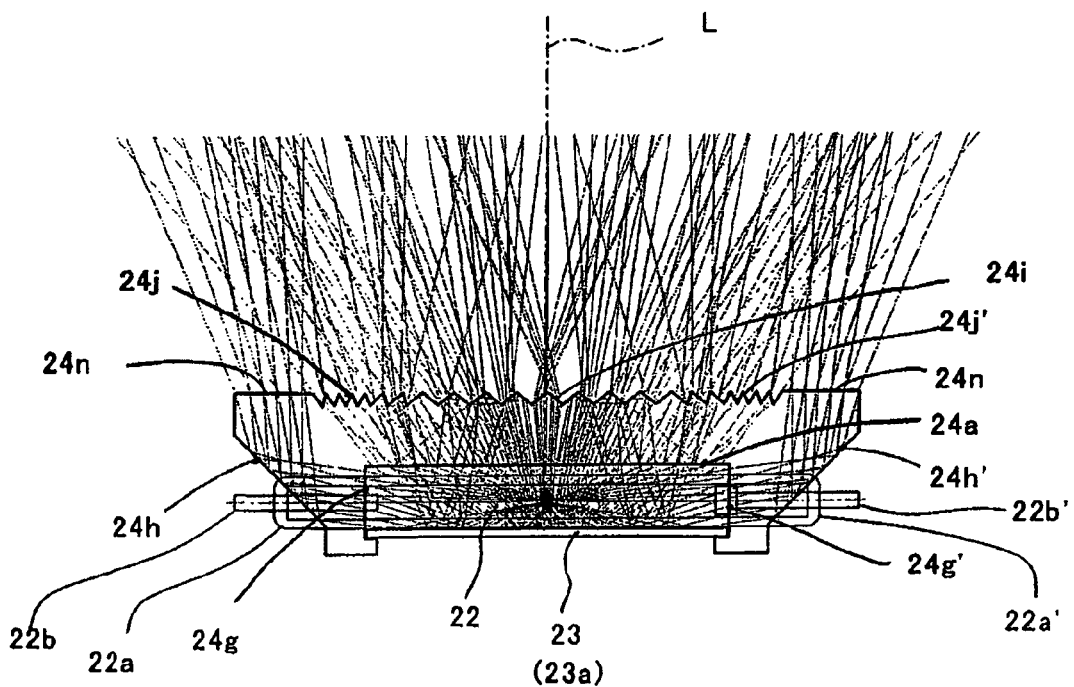
FIG. 7 is a light ray tracing diagram of the illumination apparatus of Embodiment 2.
Figure 8:
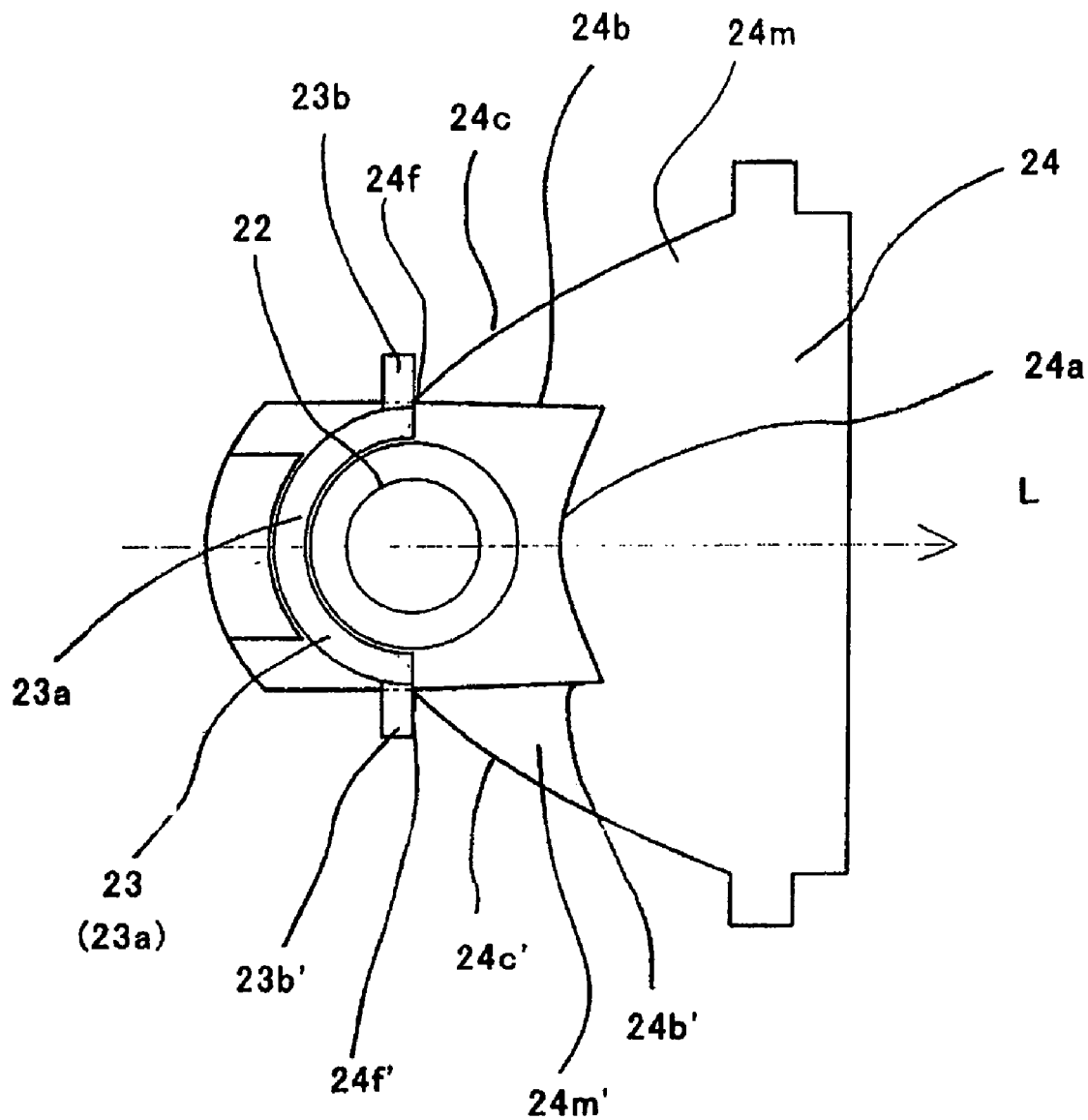
FIG. 8 is a vertically sectional view showing the structure of the illumination apparatus of Embodiment 2.
Figure 9:
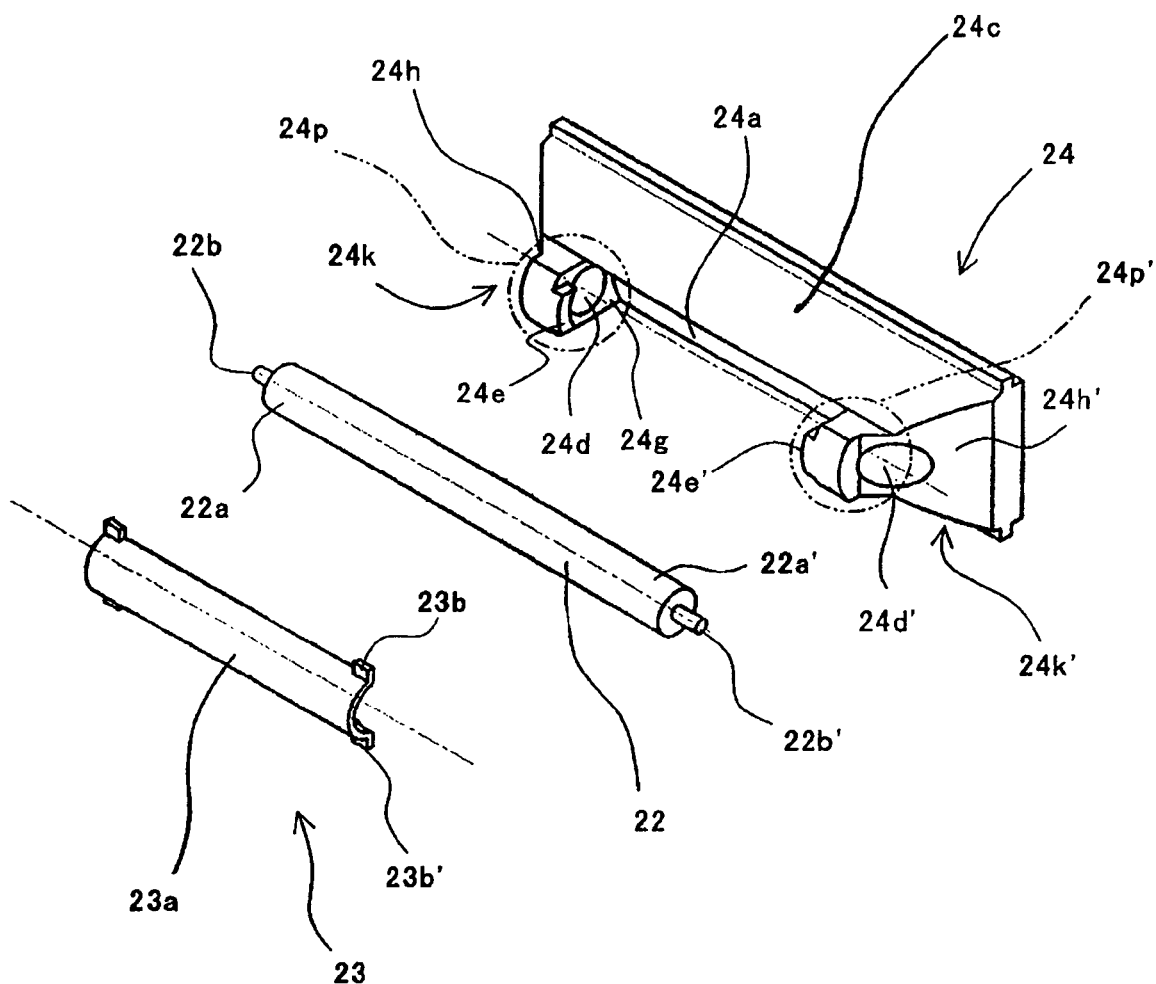
FIG. 9 is an exploded perspective view showing the illumination apparatus of Embodiment 2.

FIGS. 6 to 9 show an illumination apparatus that is Embodiment 2 of the present invention. FIG. 6 is a horizontally sectional view showing the illumination apparatus when cut at a plane including the center axis of a discharge tube. FIG. 7 is a light ray tracing diagram in which the representative light rays emitted from the center of the discharge tube are added in the horizontally sectional view of the illumination apparatus. FIG. 8 is a vertically sectional view showing the illumination apparatus when cut at a plane orthogonal to the center axis of the discharge tube. FIG. 9 is an exploded perspective view showing the substantial members of the optical system of the illumination apparatus.

First, the description will be made of the method for holding the discharge tube and a reflector, and the shape of the constituent members determining the optical characteristics of the illumination apparatus with reference to FIGS. 6 to 9.

In these figures, 22 denotes a cylindrical light-emitting discharge tube (for example, xenon tube). Hereinafter, the cylindrical light-emitting discharge tube 22 is referred to as a discharge tube 23 denotes a reflector (or reflective member) having a half cylindrical shape substantially concentric with the discharge tube 22. The reflector 23 reflects the light components emitted from the discharge tube 22 so as to return them to the center of the discharge tube 22, the light components proceeding rearward in the direction of the irradiation optical axis L (or left direction in FIG. 8), upward, and downward from the discharge tube 22. The reflector 23 is formed by a member whose light-source side surface, which substantially contacts the rear outer surface of the discharge tube 22, is made of a high-reflectance aluminum, or a resin member on which a high-reflectance metal is evaporated, etc.

24 denotes an optical member disposed forward of the discharge tube (or on a light irradiation side), in other words, on the side closer to an irradiation range than the discharge tube 22. The optical member 24 is formed integrally as a transparent member.

In the sectional view of FIG. 8, in the central portion near the irradiation optical axis L of the entrance surface of the optical member 24, a cylindrical lens surface (or positive refractive portion) 24a having positive refractive power in the direction orthogonal to the longitudinal direction of the discharge tube 22 is formed. In the upper and lower peripheral portions of the optical member 24, upper and lower prism portions 24m and 24m' having refractive surfaces (or entrance surfaces) 24b and 24b' and reflective surfaces 24c and 24c', respectively, are formed. The upper and lower prism portions 24m and 24m' function so as to substantially totally reflect the luminous fluxes, which have emitted from the discharge tube 22 and have entered the upper and lower prism portions 24m and 24m', at the reflective surfaces 24c and 24c' to lead them forward.

In the left and right peripheral portions of the optical member 24, left and right prism portions 24k and 24k' having refractive surfaces (or entrance surfaces) 24g and 24g' and reflective surfaces 24h and 24h', respectively, are formed. In the rear parts of the left and right prism portions 24k and 24k', through-hole portions 24d and 24d' for holding the glass tube ends 22a and 22a' of the discharge tube 22 are formed. The rear parts of the left and right prism portions 24k and 4k' function as holding portions 24p and 24p' that directly hold the discharge tube 22, and also function so as to reflect the luminous fluxes, which have emitted from the discharge tube 22 and have entered the left and right prism portions 24k and 24k', at the reflective surfaces 24h and 24h' to lead them forward.

The front surface of the optical member 24 is the exit surface. In the central portion of the exit surface, a plurality of prism portions 24i are formed, and in the left and right peripheral portions of the exit surface, Fresnel lens portions 24j and 24j' are formed. In the left and right peripheral portions more outer than the Fresnel lens portions 24j and 24j', plane portions 24n and 24n' are formed.

The optical member 24 is made of an optical resin material, such as a transparent silicone rubber and a transparent silicone resin, having an appropriate elasticity, a high heat resistance, and good optical characteristics, as in Embodiment 1.

Next, the detailed description will be made of the structure of the illumination apparatus of this embodiment with reference to FIGS. 6 to 8. FIGS. 6 and 7 show a basic concept for irradiating a component of the luminous flux emitted from the discharge tube 22 effectively within a predetermined irradiation angle range, the light component proceeding toward the left and right peripheral portions. FIGS. 6 and 7 show the shape of the illumination apparatus in the same section.

First, the description will be made of the method for holding the discharge tube 22 and reflector 23 by the optical member 24 with reference to FIG. 6.

As shown in FIG. 6, the rear parts (or through-hole portions 24d and 24d') of the left and right prism portions 24k and 24k' of the optical member 24 hold the glass tube ends 22a and 22a' of the discharge tube 22 by insertion such as press-fit. For holding the discharge tube 22 like this, the glass tube ends 22a and 22a' are pressed or tightly inserted into the through-hole portions 24d and 24d' while deforming the optical member 24 elastically. Thereby, the optical member 24 stably holds the discharge tube 22 at a predetermined position. However, in this embodiment, the most outer portions of the glass tube ends 22a and 22a' protrude from the sides of the optical member 24.

In addition, the optical member 24 holds the reflector 23. The reflector 23 engages with retaining portions 24e and 24e' formed at the rear ends of the left and right prism portions 24k and 24k'. Thereby, the optical member 24 integrally holds the reflector 23. As shown in FIG. 8, at the top and bottom of the front-end portion of the reflector 23, rotation stopper 23b and 23b' are formed. The contact of the rotation stopper 23b and 23b' with the rear ends 24f and 24f' of the upper and lower prism portions 24m and 24m' prevents the reflector 23 from rotating around the discharge tube 22.

The reflector 23 extends so as to substantially cover the space facing the discharge tube 22 and the entrance surfaces 24a, 24b, and 24b' of the optical member 24. Therefore, almost all luminous fluxes emitted from the discharge tube 22 (including the luminous flux reflected by the reflector 23) enter the optical member 24 from the entrance surfaces 24a, 24b, and 24b'.

The optical member 24 in this embodiment, as that of Embodiment 1, is made of a transparent material so as to have effective optical characteristics, and has characteristics suitable for holding the discharge tube 22 and reflector 23. Concretely, the left and right prism portions 24k and 24k' of the optical member 24 have an appropriate elasticity so as not to directly transmit external force acting on the optical member 24 to the discharge tube 22, and a good heat resistance.

Moreover, the optical member 24 in this embodiment is effective not only for holding the discharge tube 22 and reflector 23 and improving the optical characteristics, but also for facilitating the assembly of the illumination apparatus. In other words, an assembler elastically deforms the optical member 24 to make it hold the discharge tube 22 first, and then builds the reflector 23 onto the optical member 24. Thus, the assembly of the illumination apparatus can make best use of the characteristics of the material of the optical member 24.

Next, the description will be made of optical actions of the illumination apparatus thus constructed with reference to the light ray tracing diagram in FIG. 7.

As shown in the figure, the luminous flux emitted from the center of the discharge tube 22 is divided roughly into a first luminous flux component proceeding toward the entrance surface (or cylindrical lens surface) 24a formed at the vicinity of the irradiation optical axis L (or central portion) of the optical member 24, and a second luminous flux component emitting at an angle larger than that of the first luminous flux component with respect to the irradiation optical axis L and then proceeding toward the entrance surfaces 24g and 24g' formed in the periphery thereof. Since a third luminous flux component proceeding toward the reflector 23 is returned into the optical member 24 by the reflection of the reflector 23, it can be treated the same as one of the first and second luminous flux components.

In this embodiment, the optical member 24 effectively utilizes the luminous flux component proceeding toward the periphery, which was not utilized in the conventional illumination apparatus, as in Embodiment 1.

The luminous flux proceeding the central portion enters the entrance surface 24a of the optical member 24, is refracted by the entrance surface 24a, and then is condensed and controlled by the prism portions 24i and Fresnel lens portions 24j and 24j' to be emerged from the optical member 24.

The vortex angle of each prism portions 24i is an obtuse angle. The prism portion 24i has a shape effective for condensing the luminous flux within a predetermined angle range when the optical member 24 is disposed near the light source. The use of the shape allows most of luminous flux components that entered the prism portions 24i to be refracted and emerged within an irradiation angle of approximately 80 degrees in the horizontal direction. In addition, with the shape of the prism portions 24i the luminous flux components totally reflected by the prism portions 24i can be returned toward the light source, reflected by the reflector 23, and then reutilized. Therefore, it is possible to effectively utilize the luminous flux from the light source.

The Fresnel lens portions 24*j* and 24*j*' can restrict the emergence direction of the luminous flux to some extent because they are located peripheral portions with respect to the light source. Therefore, arranging Fresnel lens surfaces having a relatively strong refractive power at the peripheral portions gives an effective condensing action to the optical member 24.

The luminous flux component that entered the left and right entrance surfaces 24*g* and 24*g*' from the light source proceed in the left and right prism portions 24*k* and 24*k*' along the glass tube ends 22*a* and 22*a*'. This luminous flux component includes a luminous flux emitted from the glass tube ends 22*a* and 22*a*' and then entering the prism portions 24*k* and 24*k*' from the inner surfaces of the through-hole portions 24*d* and 24*d*'.

This luminous flux component is approximately totally reflected at the reflective surfaces 24*h* and 24*h*' formed on the left and right prism portions 24*k* and 24*k*', and then emerges from the plane portions 24*n* and 24*n*' of the exit surface. Therefore, optimizing the shape of the reflective surfaces 24*h* and 24*h*' can condense the luminous flux including a component that was not utilized in the conventional illumination apparatus in the predetermined irradiation range, thereby increasing the utilization efficiency of light.

Although the reflective surfaces 24*h* and 24*h*' are formed as a plane forming an angle of about 45 degrees to the irradiation optical axis L in this embodiment, the reflective surface in the present invention is not limited thereto. Other surfaces such as a curved surface and a toric surface may be used as the reflective surface. Such a curved surface is preferable for achieving a more efficient illumination apparatus.

This embodiment emphasizes the miniaturization of the illumination apparatus, compared to Embodiment 1. The thickness from the light source to the exit surface of the optical member 24 is minimized, and the width of the light source in the horizontal direction (or longitudinal direction) is set to the permissible minimum. Therefore, the discharge tube 22 is held by the optical member 24 so that the outermost of the glass tube portions 22*a* and 22*a*' may be exposed. This is different from Embodiment 1. In other words, the illumination apparatus of this embodiment does not utilize all of the luminous flux proceeding to the vicinity of the terminals 22*b* and 22*b*' of the glass tube portions 22*a* and 22*a*'. However, since the illumination apparatus utilizes part of the luminous flux that was not utilized in the conventional illumination apparatuses, it is possible to miniaturize the illumination apparatus, and to increase the light utilization efficiency.

Thus, in this embodiment, the optical member 24 itself directly holds the discharge tube 22 (and the reflector 23) by taking advantage of the material characteristics thereof, thereby eliminating the holding member used in the conventional illumination apparatuses. Therefore, the number of the constituent members of the illumination apparatus can be minimized, and the positional relationship between the discharge tube 22, reflector 23, and optical member 24 can be set accurately, thereby assuring and maintaining good optical characteristics.

Although the optical member 24 holds the glass tube ends 22*a* and 22*a*' of the discharge tube 22 in this embodiment, the portion held by the optical member 24 is not limited thereto, the central portion of the discharge tube 22 may be held, for example.

Furthermore, although the glass tube ends 22*a* and 22*a*' of the discharge tube 22 are held by pressing them into the optical member 4 in this embodiment, an insertion method such as the press fit method is not necessarily required for holding the discharge tube 22. Other holding methods, for example, a pressurized contact method can be used.

Furthermore, although the reflective surfaces 24*h* and 24*h*' formed on the sides of the optical member 24 lead the luminous flux proceeding toward the peripheral portions of the optical member 24 from the light source forward by their total reflection action in this embodiment, the structure of the optical member is not limited thereto. For example, the shape of the entrance surfaces may be designed so as to lead the luminous flux forward only by their refraction.

Moreover, although silicone resin materials such as a silicone resin and a silicone rubber are used as the material of the optical member 24 in this embodiment, materials other than the silicone resin materials may be used. For example, an optical material satisfying both the optical characteristics and the function for holding the discharge tube may be used, and a composite material that is made by combining multiple optical materials and has the same characteristics and function may be used.

Furthermore, although each of the entrance and exit surfaces of the optical member 24 has a symmetric shape with respect to the irradiation optical axis L in this embodiment, the shape is not limited thereto. For example, although the prism portions 24*i* and 24*i*' and the Fresnel lens portions 24*j* and 24*j*' are symmetric with respect to the irradiation optical axis L in this embodiment, they may be asymmetric. This is also for the reflective surfaces 24*h* and 24*h*'.

Embodiment 3

Figure 10:
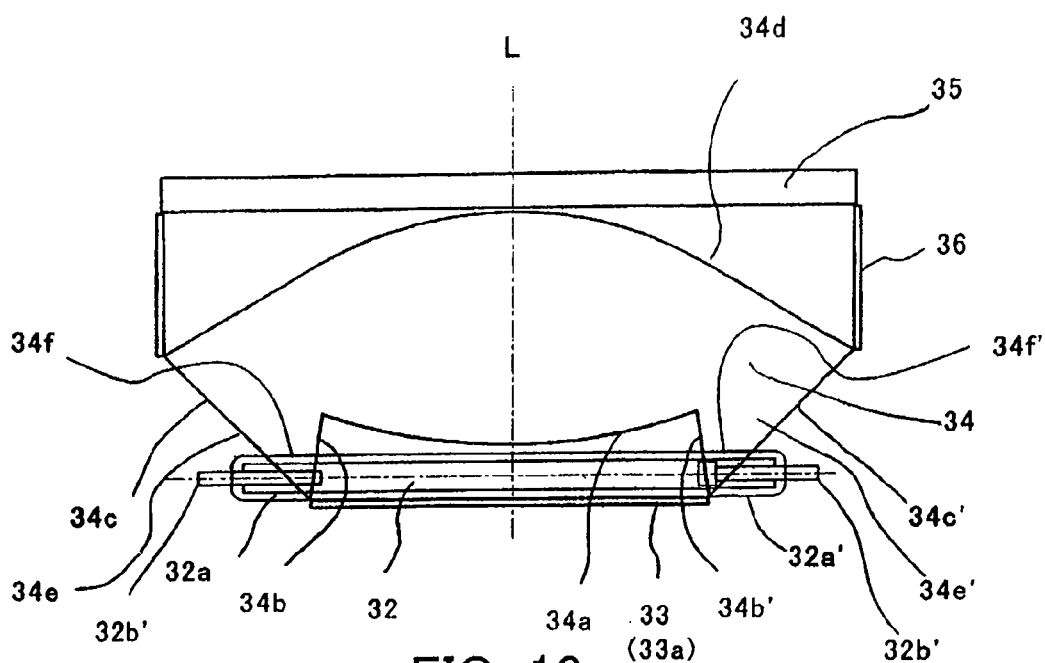
FIG. 10 is a horizontally sectional view showing the structure of the illumination apparatus that is Embodiment 3 of the present invention.
Figure 11:
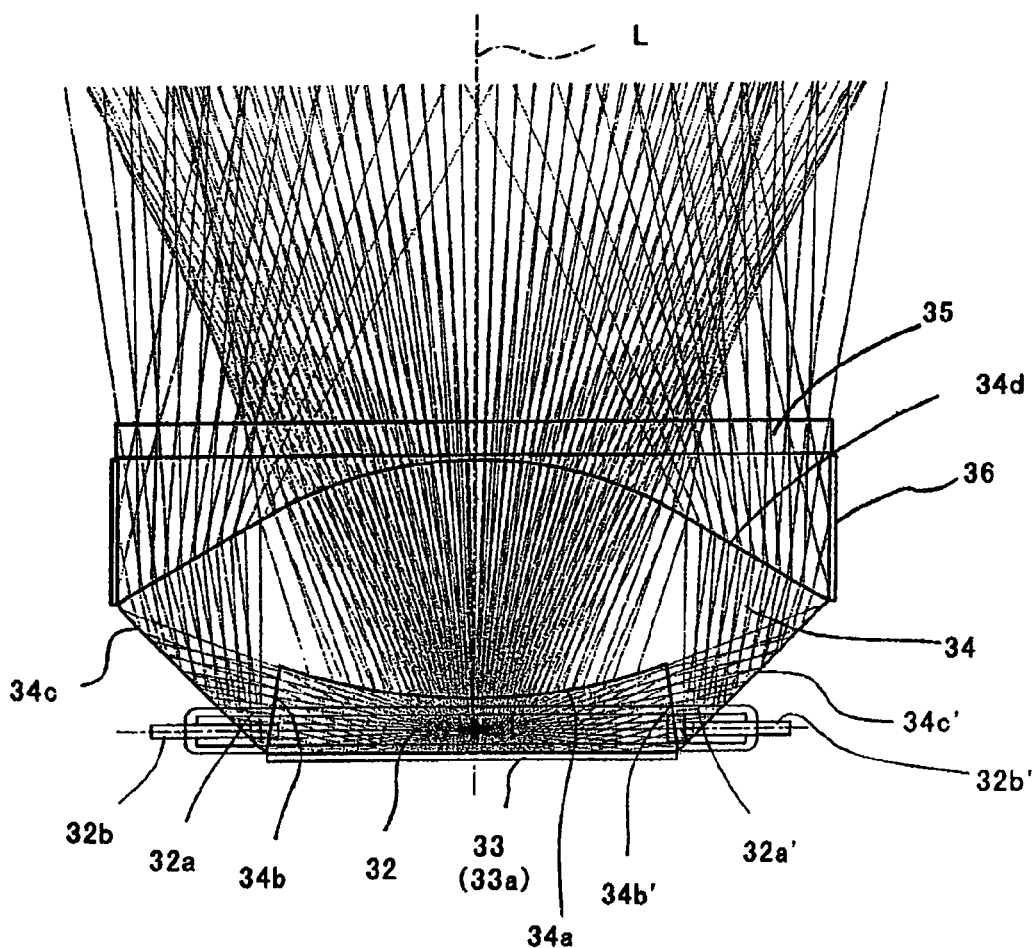
FIG. 11 is a light ray tracing diagram of the illumination apparatus of Embodiment 3.
Figure 12:
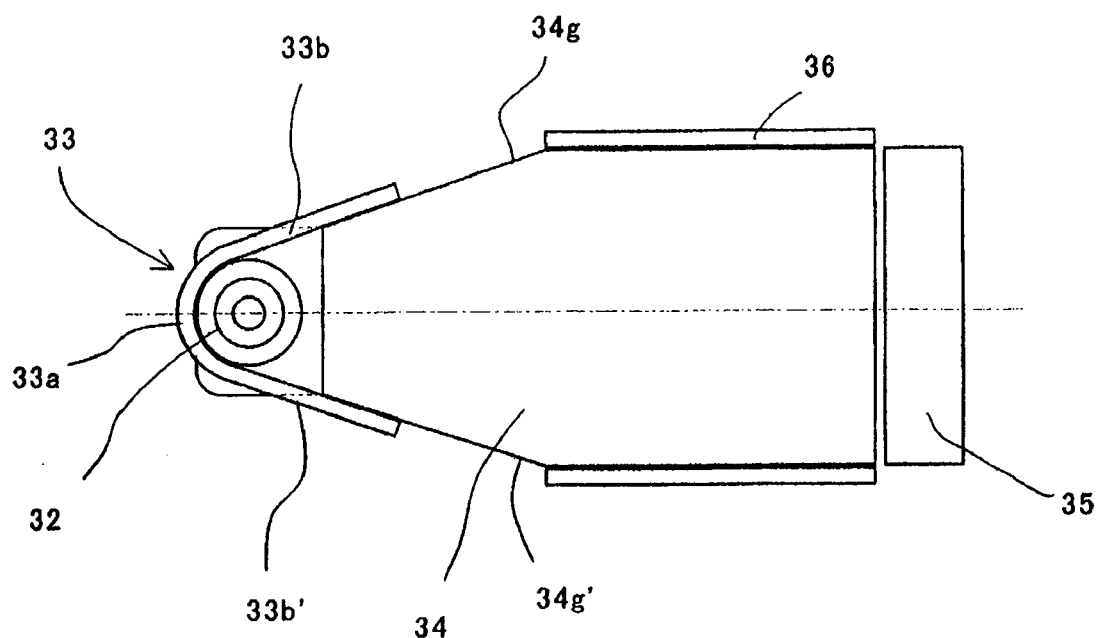
FIG. 12 is a vertically sectional view showing the structure of the illumination apparatus of Embodiment 3.
Figure 13:
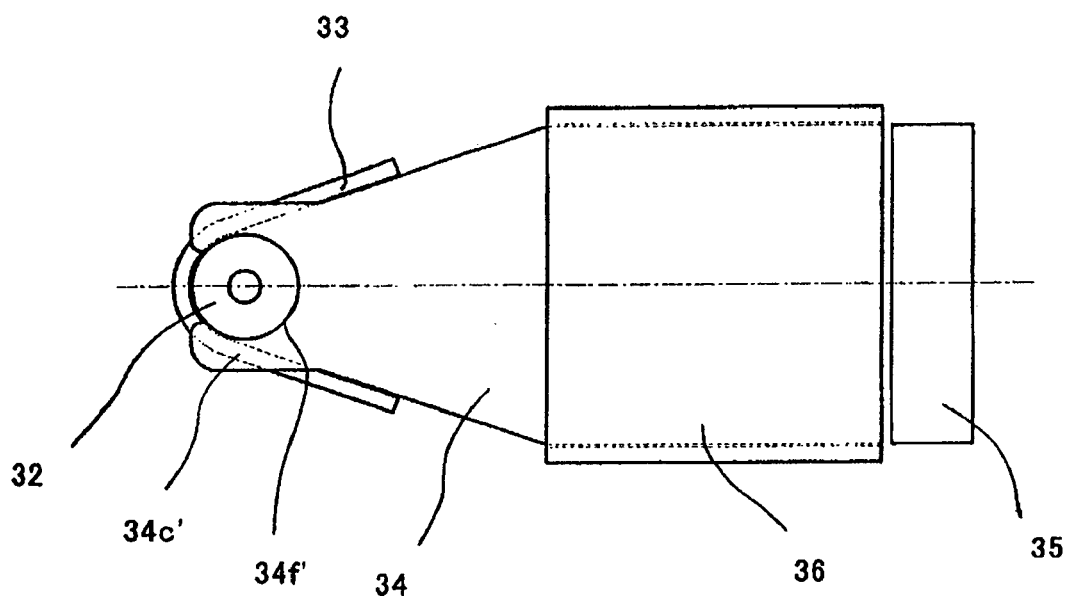
FIG. 13 is a side view showing the illumination apparatus of Embodiment 3.
Figure 14:
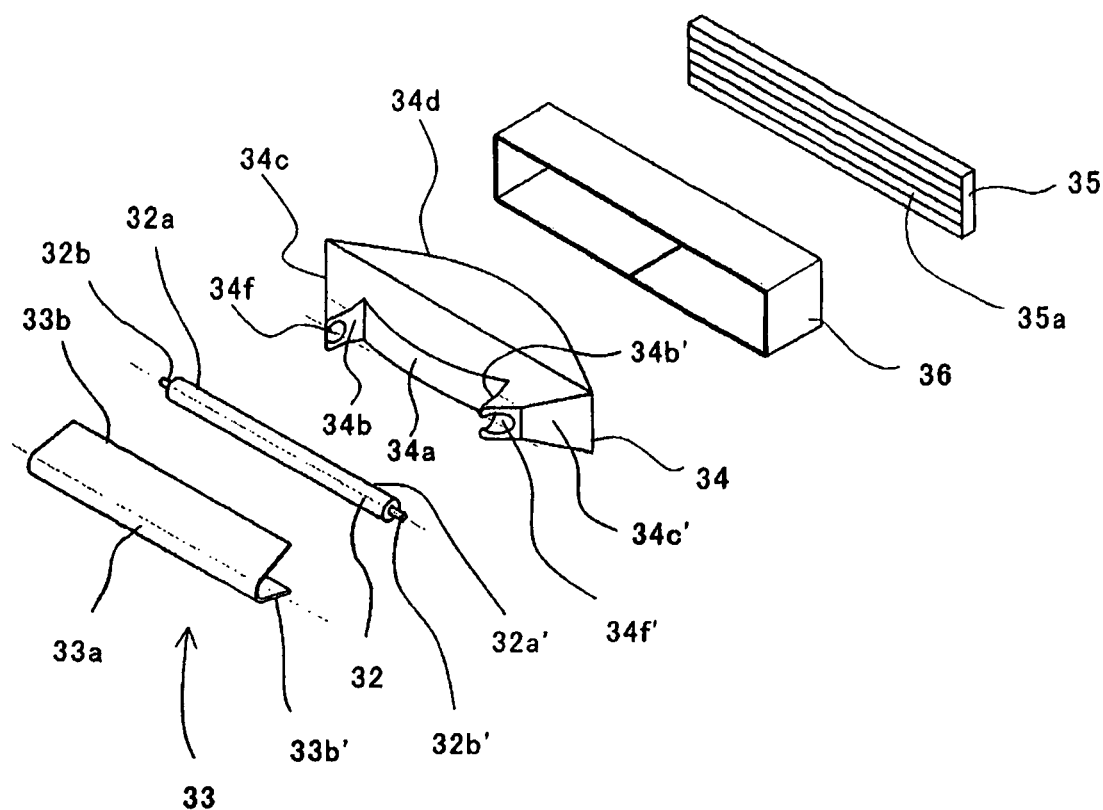
FIG. 14 is an exploded perspective view showing the illumination apparatus of Embodiment 3.

FIGS. 10 to 14 show an illumination apparatus that is Embodiment 3 of the present invention. FIG. 10 is a horizontally sectional view showing the illumination apparatus when cut at a plane including the center axis of a discharge tube. FIG. 11 is a light ray tracing diagram in which the representative light rays emitted from the center of the discharge tube are added in the horizontally sectional view of the illumination apparatus. FIG. 12 is a vertically sectional view showing the illumination apparatus when cut at a plane orthogonal to the center axis of the discharge tube. FIG. 13 is a side view of the illumination apparatus. FIG. 14 is an exploded perspective view showing the substantial members of the optical system of the illumination apparatus.

First, the description will be made of the method for holding the discharge tube and a reflector, and the shape of the constituent members determining the optical characteristics of the illumination apparatus with reference to FIGS. 10 to 14.

In these figures, 32 denotes a cylindrical light-emitting discharge tube (for example, xenon tube). Hereinafter, the cylindrical light-emitting discharge tube 32 is referred to as a discharge tube. 33 denotes a first reflector reflecting the light components proceeding rearward in the direction of the irradiation optical axis L (or left direction in FIG. 12). The first reflector 33 has a half cylindrical shape surface 33*a* that is substantially concentric with the discharge tube 32 and substantially contacts the rear outer surface of the discharge tube 32, is made of a high-reflectance aluminum, or a resin member on which a high-reflectance metal is evaporated, etc.

The upper and lower surfaces 34*g* and 34*g*' of the optical member 34 are set so that almost all luminous fluxes from the discharge tube 32 may satisfy the total reflection condition as described later. However, the upper and lower surfaces 33*b* and 33*b*' of the first reflector 33 have an optical function for returning the luminous flux that emerged from the upper and lower surfaces 34*g* and 34*g*' of the optical member 34 (that is, the luminous flux not satisfying the total reflection condition with respect to the upper and lower surfaces 34*g* and 34*g*')

into the optical member 34, and a mechanical function for stopping the rotation of the reflector 33 around the discharge tube 32.

The first reflector 33 is formed by a member whose light-source side surface is made of a high-reflectance aluminum, or a resin member on which a high-reflectance metal is evaporated, etc.

34 denotes an optical member disposed forward of the discharge tube (or on a light irradiation side), in other words, on the side closer to an irradiation range than the discharge tube 32. The optical member 34 is formed integrally as a transparent member having left and right prism portion 34e and 34e'.

As shown in FIG. 10, in the central portion near the irradiation optical axis L of the entrance surface of the optical member 34, a cylindrical lens surface (or positive refractive portion) 34a having positive refractive power in the longitudinal direction of the discharge tube 32 is formed. In the left and right peripheral portions of the optical member 34, left and right prism portions (or reflective portions) having refractive surfaces (or entrance surfaces) 34b and 34b' and reflective surfaces 34c and 34c', respectively, are formed. Further, on the exit surface of the optical member 34, a cylindrical lens surface 34d having positive refractive power in the longitudinal direction of the discharge tube 32 is formed.

35 denotes a light-emitting window. On the light-source side surface (entrance surface) of the light-emitting window 35, as shown in FIG. 14, multiple cylindrical lens surfaces 35a extending in the longitudinal direction of the discharge tube 32 and having positive refractive power in the direction orthogonal to the longitudinal direction of the discharge tube 32 are formed. This is for preventing unevenness of light distribution. The exit surface of the light-emitting window 35 may be a plane, a surface on which multiple cylindrical lens surfaces are formed as the entrance surface, or a surface on which Fresnel lens is formed.

36 denotes a second reflector that covers the circumstance of the space between the optical member 34 and the light-emitting window 35. The second reflector 36 prevents part of the luminous flux emitted from the optical member 34 from emerging from the space between the optical member 34 and the light-emitting window 35, and reflects the part of the luminous flux to lead the light-emitting window 35. The second reflector 36 is made of a thin surface-treated plate with a high-reflectance, such as aluminum plate.

The optical member 34 is made of an optical resin material, such as a transparent silicone rubber and a transparent silicone resin, having an appropriate elasticity, a high heat resistance, and good optical characteristics, as in Embodiments 1 and 2.

Next, the detailed description will be made of the structure of the illumination apparatus of this embodiment with reference to FIGS. 10 to 11. FIGS. 10 and 11 show a basic concept for irradiating a component of the luminous flux emitted from the discharge tube 32 effectively within a predetermined irradiation angle range, the light component proceeding in the horizontal direction (or right and left directions). FIGS. 10 and 11 show the shape of the illumination apparatus in the same section.

First, the description will be made of the holding method for holding the discharge tube 32 by the optical member 34, and of the relationship between the first reflector 33 and the optical member 34.

As shown in FIG. 13, at the rear parts of the left and right prism portions 34e and 34e' of the optical member 34, holding portions 34f and 34f' each of which opens rearward and has substantially a C-shape when viewed from the side are formed. The glass tube ends 32a and 32a' are pressed into the holding portions 34f and 34f'. Thereby, the optical member 34 holds the discharge tube 32.

The optical member 34 in this embodiment, as that of Embodiments 1 and 2, is made of a transparent material so as to have effective optical characteristics, and has characteristics suitable for holding the discharge tube 32. Concretely, the left and right prism portions 34e and 34e' of the optical member 34 have an appropriate elasticity so as not to directly transmit external force acting on the optical member 34 to the discharge tube 32, and a good heat resistance.

In this embodiment, the holding portions 34f and 34f' for holding the discharge tube 32 have a shape not encompassing the entire circumference of the glass tube ends 32a and 32a' of the discharge tube 32 but opening a part thereof. Further, the outermost portion of the glass tube ends 32a and 32a' expose from the optical member 34.

This is because the smaller holding portion for holding the discharge tube 32 contributes the miniaturization of the optical member and the illumination apparatus. Further, the discharge tube 32 is pressed into the holding portions 34f and 34f' from the rear while the holding portions 34f and 34f' are elastically deformed and widened. Thereby, the illumination apparatus can be assembled more easily than Embodiments 1 and 2.

Each of the holding portions 34f and 34f' sandwiches the discharge tube 32 by their elastic force, thereby making it possible to stably hold the discharge tube 32 at a predetermined position with respect to the optical member 34.

The first reflector 33 extends so as to substantially cover the space facing the discharge tube 32 and the entrance surfaces 34a, 34b, and 34b' of the optical member 34. Therefore, almost all luminous fluxes emitted from the discharge tube 32 (including the luminous flux reflected by the first reflector 33) enter the optical member 34 from the entrance surfaces 34a, 34b, and 34b'.

Next, the description will be made of the optical actions of the illumination apparatus thus structured with reference to FIG. 11.

As shown in the figure, the luminous flux emitted from the center of the discharge tube 32 is divided roughly into a first luminous flux component proceeding toward the cylindrical lens surface 34a formed at the vicinity of the irradiation optical axis L (or central portion) of the optical member 34, and a second luminous flux component proceeding toward the entrance surfaces 34b and 34b' formed at the left and right peripheral portions. Since a third luminous flux component proceeding toward the first reflector 33 is returned into the optical member 34 by the reflection of the first reflector 33, it can be treated the same as one of the first and second luminous flux components.

In this embodiment, the optical member 34 effectively utilizes the luminous flux component proceeding toward the periphery, which was not utilized in the conventional illumination apparatus, as in Embodiments 1 and 2.

The luminous flux proceeding toward the central portion of the optical member 34 impinges the cylindrical lens surface 34a that is the entrance surface having positive refractive power. This luminous flux is refracted by this surface, and then refracted by the cylindrical lens surface 34d that is the exit surface having positive refractive power to emerge from the optical member 34.

Disposing the cylindrical lens surface on each of the entrance surface and exit surface to condense the luminous flux stepwisely makes it possible to divide the refractive power onto two surfaces. Thereby, it is possible to reduce the thickness of the optical member, which has a condensing action, in the optical axis direction. Further, since the incident angles to the surfaces at the time of entrance and exit does not become too large, the loss of light amount caused by surface reflection at the surfaces is reduced. Therefore, it is possible to achieve an illumination apparatus with a good efficiency.

Furthermore, since there is not any loss of light amount caused by the edge portion of a Fresnel lens, it is possible to achieve a small sized illumination apparatus with the best efficiency.

The luminous flux that entered the left and right prism portions 34e and 34e' from the peripheral entrance surfaces 34b and 34b' proceeds in the prism portions 34e and 34e' along the glass tube ends 32a and 32a' of the discharge tube 32. This luminous flux approximately totally reflects at the reflective surfaces 34c and 34c', and then emerges from the exit surface (or cylindrical surface) 34d of the optical member 34. This luminous flux includes a luminous flux emitted from the glass tube ends 32a and 32a' and then entering the prism portions 34e and 34e' from the inner surfaces of the holding portions 34f and 34f'.

Optimizing the shapes of the entrance surfaces 34b and 34b' and the reflective surfaces 34c and 34c' can condense the luminous flux including a component that was not utilized in the conventional illumination apparatus in the predetermined irradiation range, thereby increasing the utilization efficiency of light.

In this embodiment, discharge tube 32 is held by the optical member 34 so that the outermost of the glass tube portions 32a and 32a' may be exposed, as in Embodiment 2. In other words, the illumination apparatus of this embodiment does not utilize all of the luminous flux proceeding to the vicinity of the terminals 32b and 32b' of the glass tube portions 32a and 32a'. However, since the illumination apparatus utilizes part of the luminous flux that was not utilized in the conventional illumination apparatuses, it is possible to miniaturize the illumination apparatus, and to increase the light utilization efficiency.

The luminous flux emerged from the central portion and a central side area in the peripheral portion of the exit surface 34d of the optical member 34 is emerged through the light-emitting window 35 within the predetermined object-side irradiation angle range. And, the luminous flux emerged from the most peripheral area of the exit surface 34d is emerged through the second reflector 36 and the light-emitting window 35 within the predetermined object-side irradiation angle range.

Although the reflective surfaces 34c and 34c' are formed as a plane forming an angle of about 45 degrees to the irradiation optical axis L in this embodiment, the reflective surface in the present invention is not limited thereto. Other surfaces such as a curved surface and a toric surface may be used as the reflective surface. Such a curved surface is preferable for achieving a more efficient illumination apparatus.

Further, this embodiment shows a smaller illumination apparatus than that of Embodiment 1, in which a cylindrical lens surface is formed also on the exit surface 34d of the optical member 34. However, since the exit surface 34d is a curved surface having a relatively large radius of curvature as a whole, it is not preferable as an exterior shape of the camera. That is to say, it is preferable that the exterior shape fits a planar front-face design adopted in many compact cameras. Therefore, in this embodiment, the light-emitting window 35 having a planar exit surface, etc. is provided forward of the exit surface 34d so as to obscure the curved shape retreating from the camera's front face in the peripheral portion of the exit surface 34d.

Moreover, for preventing an increase of vignetting of the luminous flux emerged from the optical member 34 because of minimizing the aperture of the light-emitting window 35, the second reflector 36 is provided in this embodiment. Using the reflection by the second reflector 36 prevents the utilization efficiency of light from reducing.

Thus, in this embodiment, the optical member 34 itself directly holds the discharge tube 32 by taking advantage of the material characteristics thereof, thereby eliminating the holding member used in the conventional illumination apparatuses. Therefore, the number of the constituent members of the illumination apparatus can be minimized, and the positional relationship between the discharge tube 32 and the optical member 34 can be set accurately, thereby assuring and maintaining good optical characteristics.

Although the optical member 34 holds the glass tube ends 32a and 32a' of the discharge tube 32 in this embodiment, the portion held by the optical member 34 is not limited thereto, the central portion of the discharge tube 32 may be held, for example.

Furthermore, although the reflective surfaces 34c and 34c' formed on the sides of the optical member 34 lead the luminous flux proceeding toward the peripheral portions of the optical member 34 from the light source forward by their total reflection actions in this embodiment, the structure of the optical member is not limited thereto. For example, the shape of the entrance surfaces may be designed so as to lead the luminous flux forward only by their refraction actions.

Moreover, although silicone resin materials such as a silicone resin and a silicone rubber are used as the material of the optical member 34 in this embodiment, materials other than the silicone resin materials may be used. For example, an optical material satisfying both the optical characteristics and the function for holding the discharge tube may be used, and a composite material that is made by combining multiple optical materials and has the same characteristics and function may be used.

Furthermore, although each surface of the optical member 34 has a symmetric shape with respect to the irradiation optical axis L in this embodiment, the shape is not limited thereto, and may be an asymmetric shape.

Embodiment 4

Figure 15:
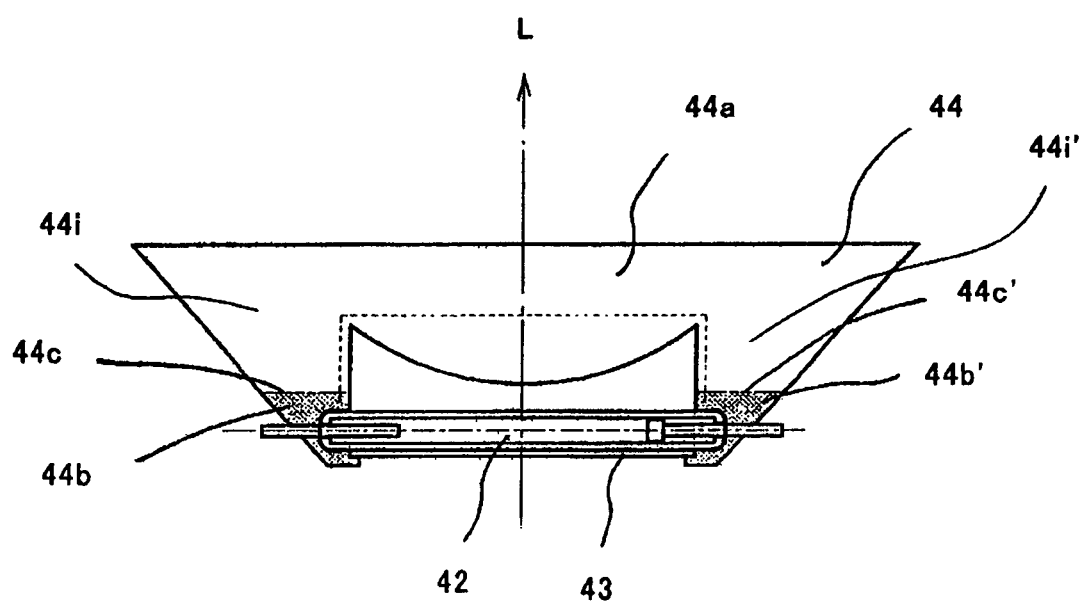
FIG. 15 is a horizontally sectional view showing the structure of the illumination apparatus that is Embodiment 4 of the present invention.

FIG. 15 shows an illumination apparatus that is Embodiment 4 of the present invention. This embodiment is a modified one of Embodiment 1 shown in FIG. 1, etc. FIG. 15 is a horizontally sectional view showing the illumination apparatus when cut at a plane including the center axis of a discharge tube.

Although the case where the optical member 4 was made of a single material was described, the optical member in this embodiment is formed by integrating multiple parts made of materials having different elasticities. The other structure is the same as in Embodiment 1.

In FIG. 15, 42 denotes a cylindrical light-emitting discharge tube (for example, xenon tube). Hereinafter, the cylindrical light-emitting discharge tube 42 is referred to as a discharge tube. 43 denotes a reflector reflecting the light components proceeding rearward in the direction of the irradiation optical axis L. The reflector 43 is formed by a member whose light-source side surface is made of a high-reflectance aluminum, or a resin member on which a high-reflectance metal is evaporated, etc.

44 denotes an optical member disposed forward of the discharge tube 42. The optical member 42 is made of two kinds of materials in this embodiment. Concretely, the optical member 42 is made of a first part 44a that is located at a position relatively distant from the discharge tube 42, has a high mechanical strength, and is transparent, and second parts (or holding portions) 44b and 44b' that directly hold the discharge tube 42, have both elasticity and transparency, and are shown as hatched portions in the figure. These parts are fixed to each other in a tight junction state without an air layer between their boundaries 44c and 44c' by junction means such as adhesion.

It is preferable that the first part 44a is made of an optical resin material having better optical characteristics and a higher surface hardness than the second parts 44b and 44b', such as a silicone resin.

On the other hand, it is preferable that the second parts 44b and 44b' are made of a silicone rubber having a higher heat resistance and a higher elasticity than the first part 44a.

Next, the junction portion (boundaries 44c and 44c') between these parts will be described. It is originally preferable that the optical member is made of a single optical material having no boundary. Because an expansion coefficient difference between the jointed materials generates a large force at the boundary when temperature or humidity changes. There is a possibility that the large force will cause breakage or detachment in the vicinity of the boundary to generate an unwanted air layer that generates optically disadvantageous phenomena. However, it is actually difficult to find out an optical material having both optical and mechanical characteristics that are required in the present invention. Therefore, it is necessary to form the optical member by combination of multiple optical materials to complement each material's defective characteristic.

For this, it is preferable to combine materials having similar compositions and properties, and to use an adhesive material having substantially the same characteristics as the materials that will be joined.

In this embodiment, the first part 44a is made of a silicone resin, and the second parts 44b and 44b' are made of a silicone rubber. Further, a transparent silicone adhesive is used between the boundaries 44c and 44c'. Combining these materials with similar compositions makes it possible to achieve an optical member, or an illumination apparatus, having resistance to environmental changes.

Next, the description will be made of the structure of the illumination apparatus of this embodiment. In the central portion near the irradiation optical axis L of the entrance surface of the optical member 44, a cylindrical lens surface having positive refractive power in the longitudinal direction of the discharge tube 42 is formed. In the left and right peripheral portions of the optical member 44, prism portions (reflective portions) 44i and 44i' having refractive surfaces (or entrance surfaces) 44b and 44b' and reflective surfaces, respectively, are formed.

In the rear parts of the prism portions 4i and 4i', concave portions are formed as in Embodiment 1. Pressing or tightly inserting the glass tube ends into the concave portions makes it possible for the optical member 44 to hold the discharge tube 42 stably at a predetermined position. The reflective surfaces of the prism portions 44i and 44i' are formed so as to cover the end faces of the glass tube ends as in Embodiment 1.

And, optimizing the shape of the entrance and reflective surfaces of the prism portions 44i and 44i' makes it possible to condense the luminous flux including a component that was not utilized in the conventional illumination apparatuses in the predetermined irradiation range, thereby increasing the utilization efficiency of light.

The optical action in the illumination apparatus is substantially the same as that of Embodiment 1.

Although this embodiment uses a silicone resin as the material of the first part of the optical member disposed forward of the light source, the material is not limited thereto. Optical materials generally having good optical characteristics and mechanical strength, such as an acrylic resin material, may be used.

Furthermore, although this embodiment uses an optical member formed by integrating two kinds of optical materials, optimization by combining three or more kinds of optical materials may be done for satisfying the optical characteristics and mechanical characteristics (such as mechanical strength, and heat resistance) that are required in each part. Moreover, the optical member may be formed, not by junction of multiple kinds of materials, but by using a single material whose optical and mechanical characteristics change continuously with parts.

Furthermore, although the junction portion (44c and 44c') of the different materials is formed as a plane disposed near the light source and parallel thereto, the position and shape of the junction portion is not limited to this, various modifications may be made according to the mechanical holding conditions or optical requirement for the members. For example, although the rear part of the prism portion formed in the peripheral portion is made of a material having a higher elasticity than the central portion or exit surface-side portion in this embodiment, the entire prism portion may be made of that material. The entire entrance surface-side portion near the light source, which includes the central portion, may be made of a material having a higher heat resistance than the exit surface-side portion.

As described above, according to each embodiment, since the optical member itself has the holding portion for holding the light source, the luminous flux that entered the holding portion can be utilized effectively, thereby making it possible to achieve an illumination apparatus with high efficiency. In other words, it is possible to utilize the luminous flux emitted mainly from the vicinity of the terminals of the light source, which was not sufficiently utilized in the conventional illumination apparatuses because it stayed inside the illumination apparatus or image-taking apparatus. Therefore, it is possible to increase the utilization efficiency of light of the illumination apparatus.

Furthermore, since the optical member having a condensing action directly holds the light source, it is possible to directly set the positional relationship between the optical member and the light source without an intermediate member. Therefore, it is possible to minimize adverse effects caused by dimension errors of the members, thereby making it possible to achieve the optical characteristics near the optical design values.

Moreover, since the optical member and the light source can be treated as one body, it is possible to facilitate the assembly of the illumination apparatus. And, since the number of the constituent members can be reduced, it is possible to reduce the cost of the illumination apparatus.

Moreover, using a material whose optical and mechanical characteristics differ partially or combining multiple materials having different optical and mechanical characteristics makes it possible to realize a small illumination apparatus with high optical performance, reliability, safety, and ease of assembly, which conventionally have not been available.

This application claims foreign priority benefits based on Japanese Patent Applications No. 2005-027171, filed on Feb. 3, 2005, which is hereby incorporated by reference herein in its entirety as if fully set forth herein.

What is claimed is:

1. An illumination apparatus used for image taking, comprising:

a light source that is a discharge tube; and an optical member filled thereinside with a resin material capable of transmitting light, wherein the optical member includes:

a prism portion having an entrance surface through which light from the light source enters the optical member, an exit surface and a reflective surface reflecting the light from the light source toward the exit surface; and a holding portion which is formed integrally with the optical member and holds the light source only at its area adjacent to a terminal of the light source, and wherein the holding portion has elasticity and a shape covering part or whole of a circumference of the area adjacent to the terminal, and an inner surface of the holding portion allows light from the light source to enter the optical member to lead it toward the exit surface.

2. The illumination apparatus according to claim 1, further comprising a reflective member disposed on the side opposite to the optical member with respect to the light source, and the optical member holds the reflective member.

3. An image-taking apparatus comprising:

the illumination apparatus according to claim 1; and an image-taking system taking images of an object illuminated by the illumination apparatus.

* * * * *